March 16, 1937.   M. E. CARROLL   2,073,607
MEANS FOR GENERATING GASEOUS FUEL ADMIXTURES
Filed Oct. 17, 1934    6 Sheets-Sheet 2

Manly E. Carroll,
INVENTOR
BY Seymour & Bright
ATTORNEYS

March 16, 1937.　　　M. E. CARROLL　　　2,073,607
MEANS FOR GENERATING GASEOUS FUEL ADMIXTURES
Filed Oct. 17, 1934　　　6 Sheets-Sheet 5

Inventor
Manly E. Carroll,
By Seymour & Bright
Attorneys

Patented Mar. 16, 1937

2,073,607

UNITED STATES PATENT OFFICE 2,073,607

MEANS FOR GENERATING GASEOUS FUEL ADMIXTURES

Manly E. Carroll, Miami, Fla., assignor to The Universal Generators Corporation, Inc., Miami, Fla., a corporation of Florida Application October 17, 1934, Serial No. 748,742

7 Claims. (Cl. 123—133)

The present invention relates to a novel and improved method and means for generating gaseous fuel admixtures, especially for use in internal combustion engines and the present application is a continuation in part of my abandoned application Serial No. 581,035, filed December 14, 1931.

The primary object of the invention is to provide a system, wherein a mixture of air and hydrocarbons is heated by the exhaust gases of the engine in order to convert the mixture into a gaseous stream which, after conversion, is cooled and mixed with secondary air before the combined mixture is introduced into the cylinders of the engine, the essential characteristic of the system being the production of a gaseous stream of substantially constant character, irrespective of the speed of operation of the engine and of the resultant highly variable quantity of exhaust heat.

A further object of the present invention is to provide a system of the aforesaid character wherein the essential component parts are such and of such relative dimensions as to assure the production of a gaseous fuel stream of substantially constant character, regardless of the wide range of temperature of the exhaust heating gases due to the changes in R. P. M. of the engine.

Still another object of the invention is the provision of varying ratios of primary air and fuel in a system of the character here involved, and of means to assure such varying ratios corresponding to varying R. P. M.'s and the resultant variable heat content of the exhaust gases, so that, as a result of such ratios and of the predetermined dimensions and size relationships of the parts of the system, there is a very little or substantially no practical difference in gas temperatures at the discharge end of the generator.

The foregoing and other objects, which will become apparent to those skilled in the art to which the invention pertains as the description thereof proceeds, are attained by means of the novel features and relationship of parts hereinafter set forth in detail, illustrated in the accompanying drawings, and more particularly pointed out in the claims hereunto appended.

At the outset of the detail description of the invention, it will be noted that my apparatus may be employed with any type of internal combustion engine in which a fuel mixture is formed at the exterior of the engine, and then introduced into the same, but for the purpose of disclosing the invention, I have shown the same attached to one type of four-cylinder engine. In this embodiment of the invention, 12 designates the engine which has an intake manifold 13 and an exhaust manifold 14, held in place by the usual bolts 15.

Figure 2:
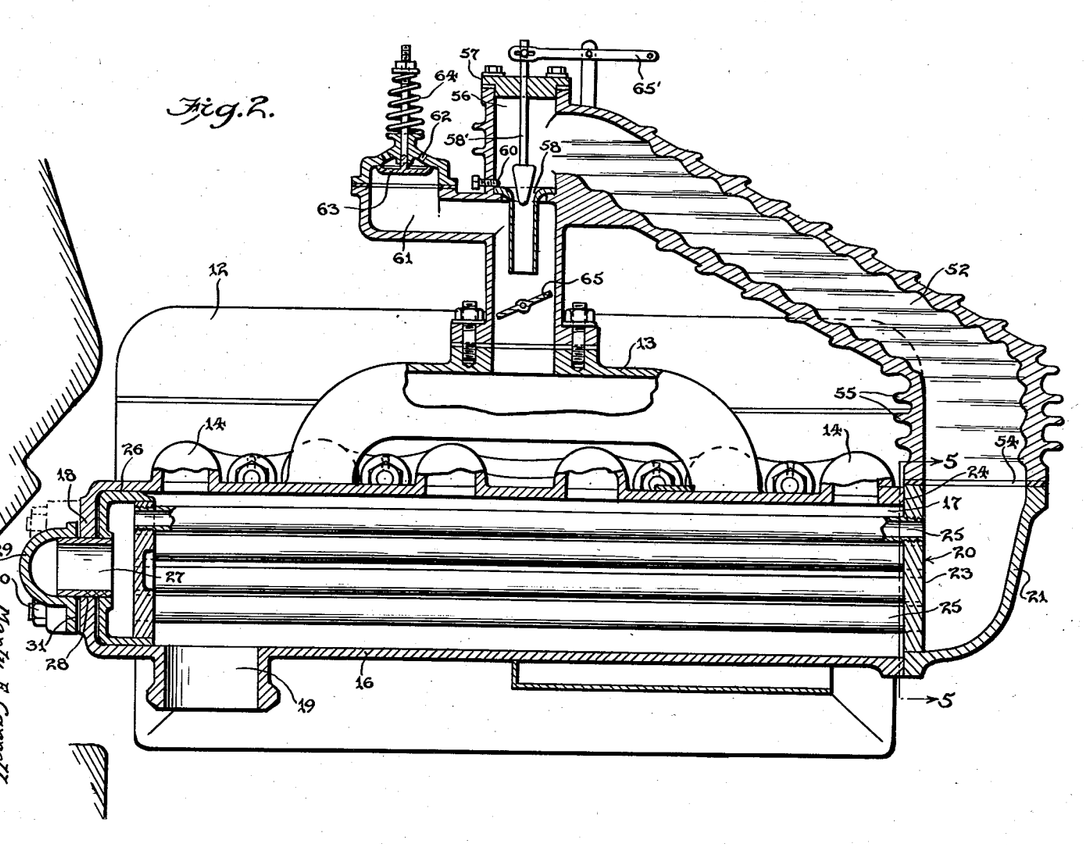
Fig. 2 is a similar view mainly in vertical section and with certain parts removed.

In accordance with my invention, the elbows of the exhaust manifold discharge into a shell 16 which has its front end open as shown at 17 in Fig. 2, and its rear end partially closed as indicated at 18. The hot exhaust gases which are discharged from the engine directly into this shell, after imparting their heat units to a fuel mixture passing through the shell, are discharged by way of a nipple 19 to the usual exhaust pipe, not shown. The outlet 19 is equal in area to the combined area of the elbows to eliminate back pressure.

The shell cooperates with a novel form of cartridge 20. At the front end of the generator, this cartridge is provided with an elbow 21 which may be secured to the front end of the shell by any suitable means, such as bolts 22; and a plate 23 forming a part of the elbow, closes the open end of the shell. Any suitable type of gasket 24 may be placed between the front end of the shell and the plate to provide a gas-tight joint. Tubes 25 have their front ends rigidly secured to the plate in any suitable way, and the rear ends of these tubes are rigidly secured in ports forming part of a hollow guide fitting 26, the external shape of which coincides with the internal shape of the shell, so that the fitting 26 functions as a guide and sliding support for the rear ends of the tubes. A collar 27 is fixed to the fitting and projects from the same, and when the cartridge is introduced into the shell, the collar slidably engages a port 28 in the end of the shell. This construction permits expansion and contraction of the tubes without liability of rupturing the shell or tubes. Obviously, when the nuts on the bolts 22 are removed, the entire tube cartridge can be slid out of the shell as a unit.

Figure 4:
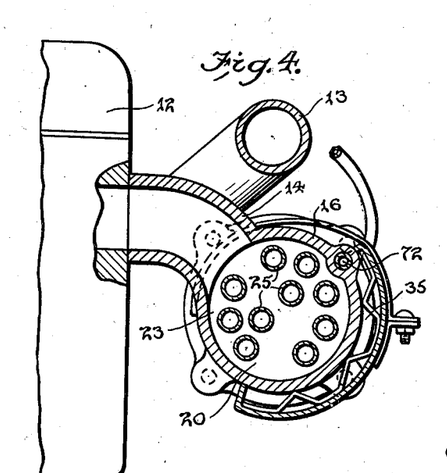
Fig. 4 is a transverse vertical sectional view of the generator and a portion of the intake manifold, taken on the line 4—4 of Fig. 1.
Figure 5:
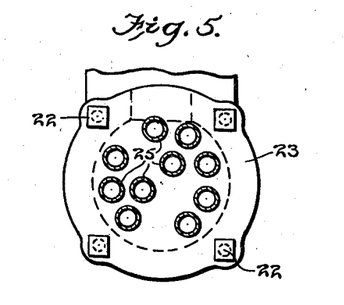
Fig. 5 is a similar view of the generator, taken on the line 5—5 of Fig. 2.
Figure 6:
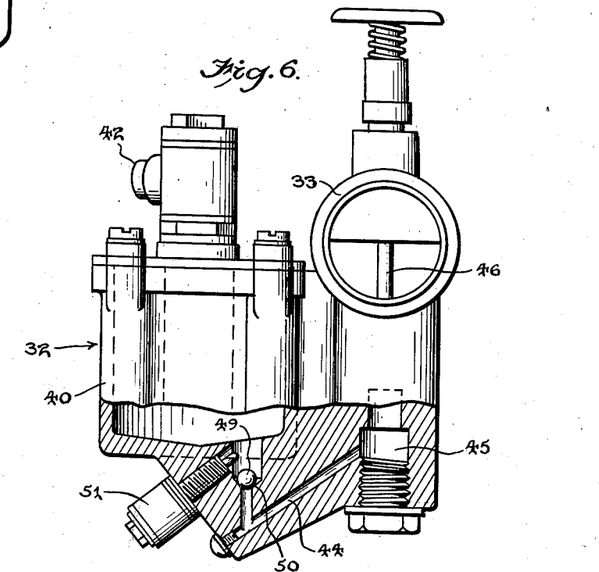
Fig. 6 is an enlarged elevation of a portion of the carburetor partly in vertical section; the section being taken on the line 6—6 of Fig. 3.

It will be noted, from Figs. 4, 5, and 13, that tubes 25, which are ten in number and of predetermined dimensions and size relative to the other parts, as will hereinafter appear in greater detail, are irregularly arranged, substantially as illustrated, whereby the tubes farthest from the engine block are enabled to receive the same amount of heat from the exhaust gases as the tubes which are nearest the engine block.

An elbow 29 is detachably secured to the rear end of the shell by any suitable means, such as bolts 30, and a gasket 31 is interposed at the joint. This gasket not only provides an effective seal between the elbow and the shell, but as it surrounds the projecting collar 27, it will prevent any gas from passing between the collar and the portion of the elbow into which the collar projects.

A primary mixture of air and fuel is fed to this gasifier by a carburetor 32 which may be of any suitable construction. For the purpose of disclosing the present invention, I have shown a carburetor having a horizontally disposed Venturi tube 33, one end of which is secured to the inlet end of the elbow 29 by bolts 34. The other or entrance end of this tube can receive air directly from the atmosphere or from a device 35 which permits either hot or cold air to be used. This device is clamped to the shell of the gasifier in any suitable way, and it provides a passageway 36 through which air may be fed along the heated wall of the shell into a passageway 37, and from the latter into the Venturi tube of the carburetor. If heated air is not required, a valve 38 in the device 35 can be operated to close the passageway 37, and then the air can enter the carburetor directly through a passageway 39.

Figures 3, 7, 8:
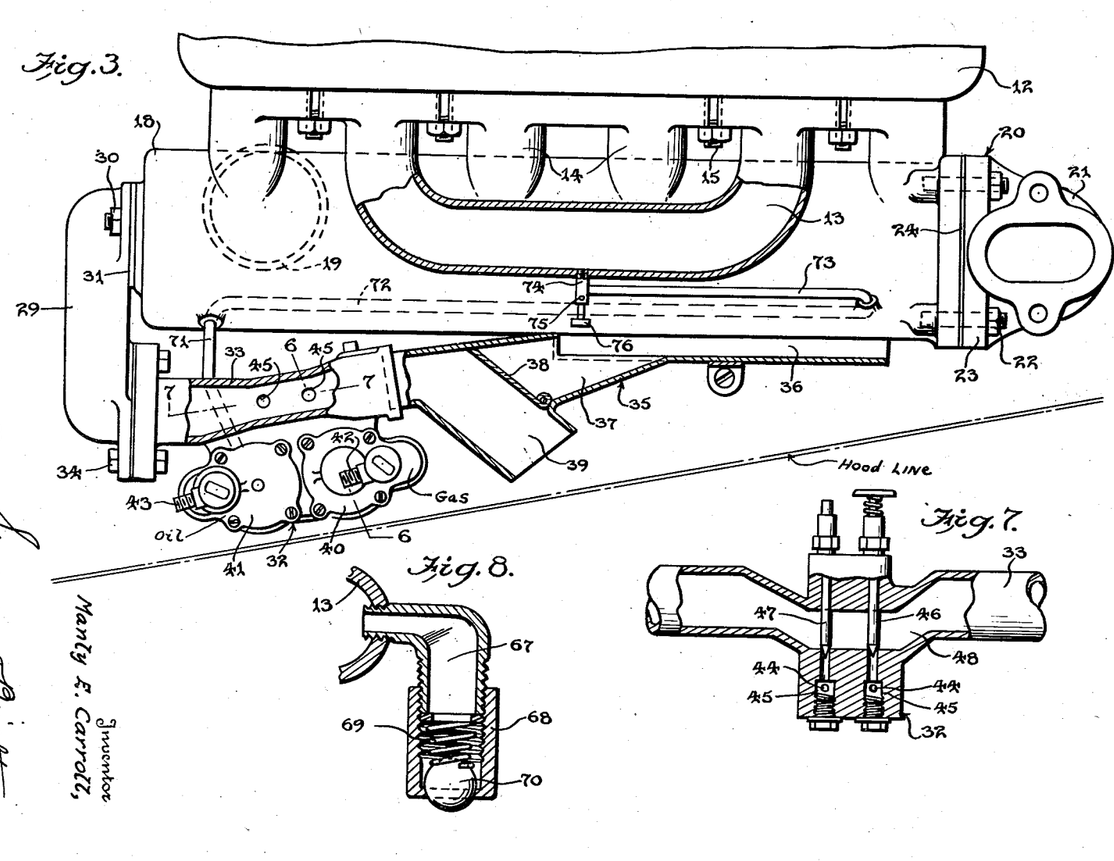
Fig. 3 is a top plan view with portions broken away and with certain parts omitted.
Fig. 7 is a vertical sectional view of a detail of the carburetor on the line 7—7 of Fig. 3.
Fig. 8 is a transverse vertical sectional view of the cleaner valve taken on line 8—8 of Fig. 1.

The carburetor has a bowl 40 for gasoline, and a bowl 41 for heavier oil, and these bowls may be supplied with such fuels from suitable supply tanks, not shown, which are connected respectively to the intakes 42 and 43 of the bowls. Each bowl has a conventional float control, not shown, and from the bottoms of the bowls, the fuel is fed through passageways 44 to wells 45 which are spaced lengthwise of the Venturi tube 33. As best shown in Fig. 7, the well from the gasoline bowl is controlled by a needle valve 46, and the well of the heavier oil bowl is controlled by a needle valve 47, which valves are manually set for proper adjustment. At the place where the wells open into the Venturi tube, the latter dips downwardly in the form of a valley 48, so that the air passing through the Venturi tube will sweep downwardly and pick up fuel which has entered the valley from the wells.

It is desirable, when starting the engine, to use gasoline as fuel, and after the gasifier becomes sufficiently heated, to switch over to a heavier oil. Consequently, the passageways 44 are controlled by valves 49, which seat by gravity in pockets 50. Each valve may be raised by an electro-magnet 51, and these magnets can be manually and automatically controlled by suitable means, not shown. In practice, the control means will be such that when the ignition switch is turned, the valve 49 of the gasoline passageway 44 will be lifted while the valve of the heavier oil passageway 44 will be permitted to remain seated. After the gasifier has been heated, a thermostat in connection with the latter will cause release of the ball 49 of the gasoline passageway, and lifting of the ball of the heavier oil passageway by introducing current into the electro-magnet 51 of the oil bowl, and cutting it off from the electro-magnet of the gasoline bowl. The control should also be such that in case the heavier oil should be exhausted, a manual switch can be turned to switch over from the heavier oil to the gasoline fuel.

The suction of the engine is employed in a manner hereinafter explained, to draw a primary mixture of air and fuel through the carburetor, regardless of the type of the latter, and then this mixture, under the minus pressure existing in the elbow 29 and tubes 25, is heated and tends to expand, due to the vapor pressure of the fuel undergoing the heat treatment. Consequently, the mixture which enters the elbow 21 is thoroughly gasified and is at such a temperature and under such a minus pressure that it remains in this gasified condition for a considerable period of time. However, for the purpose of efficiency, it is undesirable to introduce the gasified mixture in this highly heated condition, directly into the cylinders of the engine. Consequently, I treat the same further before feeding it into the engine. In accordance with my invention, a cooling tube 52 receives the gaseous mixture from the elbow, and this cooler has one of its ends detachably secured to the elbow by bolts 53 which also serve to squeeze the gasket 54 which is used as a sealing medium between the lower end of the cooler and the elbow. Fins 55 on the exterior of the cooler tend to radiate heat from the latter into the air surrounding the engine.

Figure 14:
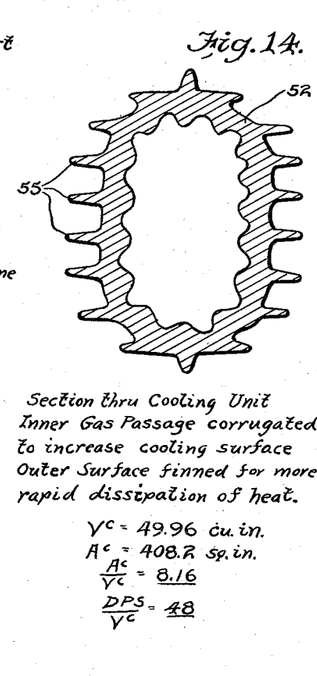
Fig. 14 is a sectional view through the cooling tube, taken along line 14—14 of Fig. 2.

The interior surface of the cooler may be corrugated, as shown in Figs. 2 and 14, to increase the effective cooling surface thereof.

One end of the cooler terminates in a vertical passageway or pipe 56, the upper end of which is closed by a detachable cap 57. When the latter is removed, a removable nozzle 58 can be introduced into the passageway so that its upper end may be brought to rest on a shoulder 59. A screw 60 may be employed to hold the nozzle 58 in place. Extending through cap 57 and adapted to reciprocate vertically is valve member 58', the lower conically enlarged head of which is adapted to coact with the upper end of nozzle 58 to define a more or less constricted annular passageway thereinto. An alternative construction is the employment of a Venturi tube in place of nozzle 58 and constricting member 58'. An elbow 61 opens into the vertical passageway 56 at a point intermediate the length of the nozzle, and functions as a passageway for secondary air which enters through ports 62 controlled by a valve 63 which in turn is controlled by the suction of the engine and by a spring 64. Secondary air entering through the elbow is mixed with the primary gaseous mixture discharged from the nozzle 58, and it will be understood that the latter not only increases the velocity of the primary gaseous mixture, but even though there is an entry of relatively cold secondary air into passageway 56, at the outlet of the nozzle, the latter tends to equalize pressure within the upper end of the passageway 56 and the elbow 61.

Figure 1:
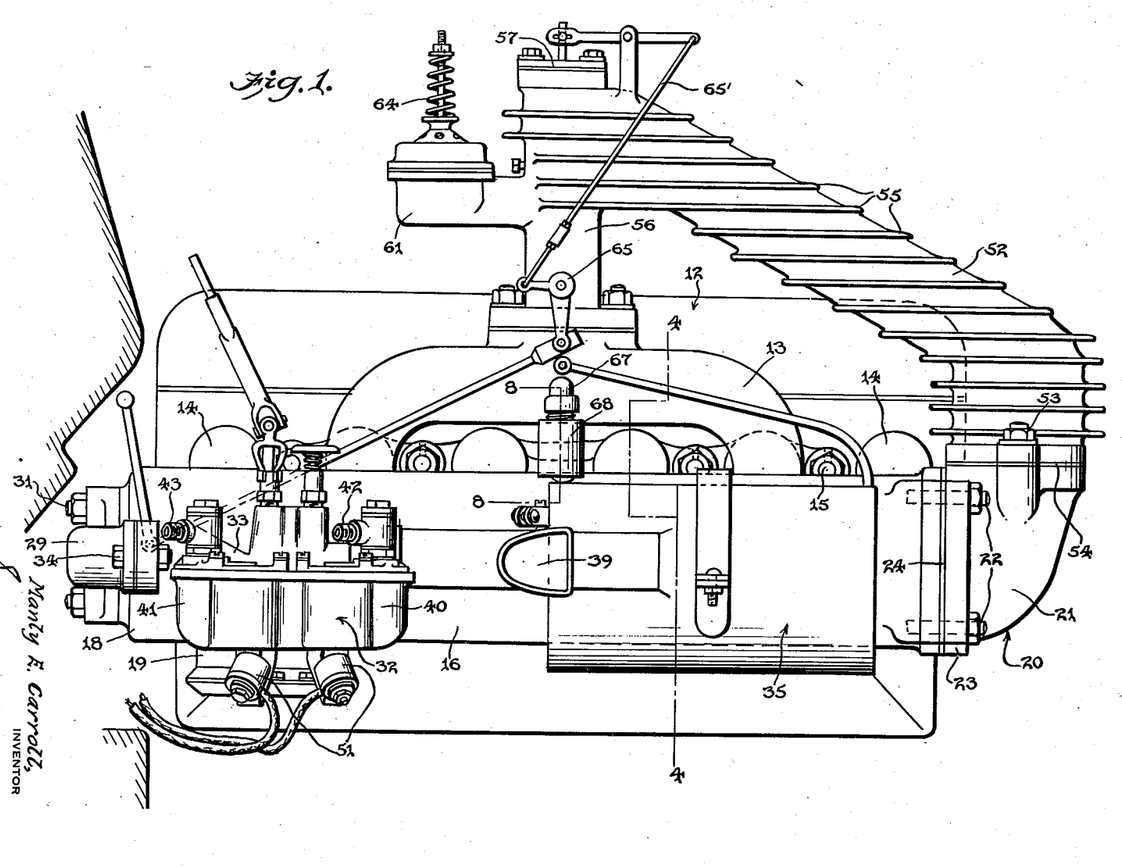
Fig. 1 is a side elevation of the improved apparatus and a portion of one type of an internal combustion engine with which it may be used.

A throttle valve 65 is interposed in the passageway posterior to the nozzle 58, and this throttle is actuated and functions in the usual manner. As is shown in Figs. 1 and 2, a system of links and levers 65' interconnects throttle valve 65 and valve member 58', whereby the latter are simultaneously actuated. After the combined mixture passes the throttle valve, it enters the intake manifold.

At times when the throttle valve is moved to a substantially closed position while the engine is running at sufficient speed to create a very low minus pressure in the intake manifold 13, the suction during deceleration will tend to draw a rich fuel mixture past the throttle and into the intake manifold. At such times, it is therefore desirable to introduce a sufficient amount of additional air to burn this excess fuel in the charge. For this purpose, I connect to the intake manifold, posterior to the throttle 65, an elbow 67 having a ported threaded cap 68 which may be adjusted on the elbow to increase or decrease the force of a spring 69 which is arranged in the cap and acts upon a ball valve 70 which controls the port of the cap. Obviously, when the spring is properly adjusted and the suction during deceleration in the elbow is sufficient, the valve 70 will be raised from its seat and cleaning air will flow through this device into the intake manifold 16, with a view of supplying the necessary oxygen to burn the excess fuel in the gaseous mixture which flows downwardly past the throttle valve.

It is also desirable at times when the throttle is closed, to feed fuel and air directly to the intake manifold for idling purposes.

Figures 9, 10, 11:
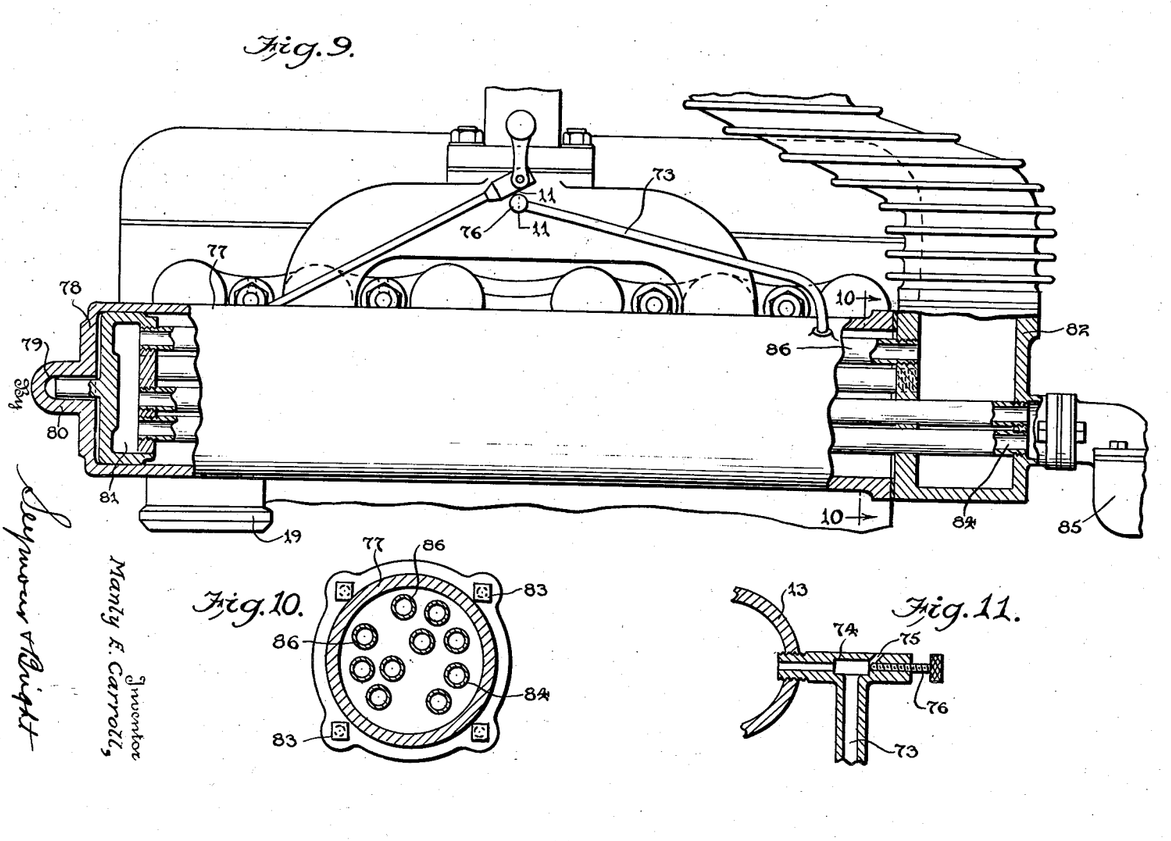
Fig. 9 is a vertical sectional view of a modified form of generator.
Fig. 10 is a transverse vertical sectional view of the same on the line 10—10 of Fig. 9.
Fig. 11 is a sectional view of the valve employed during idling for leading auxiliary fuel directly into the intake manifold from one of the carburetor bowls, and for mixing this fuel with auxiliary secondary air.

In accordance with my invention, this can be accomplished by leading a relatively small tube 71 from the bowl 41 of the carburetor to a passageway 72 which extends through the wall of the shell 16 of the gasifier, whereby the fuel may be heated in its travel through said passageway. From the latter, another small tube 73 leads this idling fuel to the manifold at a point posterior to the throttle valve. As shown in Fig. 11, the passageway 73 terminates in a valve casing 74 which is screwed into the intake manifold. This casing has an idling air intake port 75 controlled by a needle valve 76. From this description, it will be understood that when the throttle is substantially closed and the engine is idling, suction within the intake manifold will cause fuel to travel directly from the bowl 41 of the carburetor through 71, 72, 73, and 74, and in the latter, it will be mixed with air entering at 75 before the heated gaseous mixture passes into the intake manifold.

Instead of using the type of heater or gas generator which I have shown in Figs. 1 to 9 inclusive, I may employ a gasifier in which the mixture travels through a longer passageway in the gasifier. One such type of gasifier which I have invented, is shown in Figs. 9 and 10. In this modification, the shell 77 of the gasifier will have one of its ends completely closed, as shown at 78, and provided with a guideway 79 having a tit 80 which projects from the closed end of the tube cartridge 81. The other end of the cartridge terminates in a hollow block 82 which may be bolted at one side, as shown at 83 to the open end of the shell for closing the latter. The upper open end of the block can be bolted to the cooler which leads to the intake manifold of the engine. In this modification, some of the tubes 84 of the cartridge pass through the block and are connected to the outlet of the carburetor 85, and after the mixture passes through such tubes, it is transferred by the hollow end 81 of the cartridge to the other tubes 86 through which the mixture travels in the opposite direction and enters the block 82. Obviously, the mixture of fuel and air, in this form of the invention, will travel in the gasifier through a passageway about twice as long as that in the gasifier in Fig. 1, and as the result, a greater amount of heat units will be impounded in the gasified mixture discharged into the hollow block 82.

Manifestly, it is advisable in actual practice to make the tubes of the cartridge of suitable metal through which heat may be readily transferred, and it is also advisable to make such tubes of a material which will not expand to too great an extent due to the heat which is imparted thereto.

An essential characteristic of the present invention is the fact that it makes possible the production of a gaseous stream of fuel mixture of substantially constant character, irrespective of the speed of operation of the engine and of the resultant highly variable heat content of the exhaust gases.

Tests have shown that the exhaust temperatures in an internal combustion engine employing external means for preparing a suitable gaseous fuel for the motor, wherein the liquid fuel used is a low grade fuel such as a distillate or furnace oil of about 28–36° Bé., vary from an approximate maximum of 1640° F. to an approximate minimum of about 440° F.,—a variation of about 1200°.

It is evident that if use were made of a fixed ratio of primary air and fuel of such character that satisfactory fuel generation took place at the low temperature, corresponding to the low R. P. M. of the motor, this generation must be unbalanced and overheating must occur as soon as the speed of the motor,—and correspondingly, the heat content of the exhaust gases,—is increased.

Tests have shown that such unbalancing and overheating are exactly what occur under the circumstances outlined. When the heat given off by the exhaust gases reaches a temperature above that of the final boiling point of the fuel being treated, cracking of the fuel takes place. When the fuel is cracked, a change in the molecular structure of the fuel takes place leaving heavy deposits of tar and petroleum-coke through the device, which in a few hours effectively blocks the tubes in the heater so that passage through them is impossible. In a very few minutes after this takes place, the heating tubes burn in two. In an effort to get away from this condition, a greater amount of fuel to air has been resorted to (fuel cooling) and the devices so constructed so as not to allow anything but heavy vapor to be made.

Now again it is apparent that if the vapor is in a proper condition for combustion when the motor is operating at high R. P. M. and the motor is subsequently slowed down, then instead of a vapor it is really globules of liquid that are being taken into the cylinders. This will result in irregular operation, smoke, odor, crank case dilution, etc. all of which is generally referred to by the profession as an uncontrollable fuel, so called, because of continuous changes in the character of the fuel as the motor is slowed down or speeded up. This occurs because of the varying heat in exhaust gases. Now, again, if the temperature is correct for the slower speeds, then when the motor is speeded up to a higher R. P. M. the fuel is heated to such a degree that a great loss of power is the result.

In harmony with my invention, there is no fixed proportion of primary air or fuel; instead, the ratio varies with every change of speed of the motor. When the motor is operated at a low R. P. M. and the heat supplied from the exhaust gases is low, approximately 90% of the total air goes through the primary port 28. At the maximum R. P. M., when the heat is greater, only 17% of the total air goes through the primary port 28.

It has been found that the dimensions of certain parts of the system, as well as the size relationship therebetween, is critical, if a gaseous fuel of constant character is to be produced by means of variable speed motor heat. The dimensions of the device must be such as to maintain relatively constant velocities through the generating device regardless of the R. P. M. and regardless of the wide range of temperature due to the different speeds, so that there is only a very small difference in gas temperature at the discharge end of the generator. In order to handle the widely varying fuel mixture ratios, the dimensions of the essential parts of the device must be such that the entire fuel charge may pass through the generator.

Figures 12, 13:
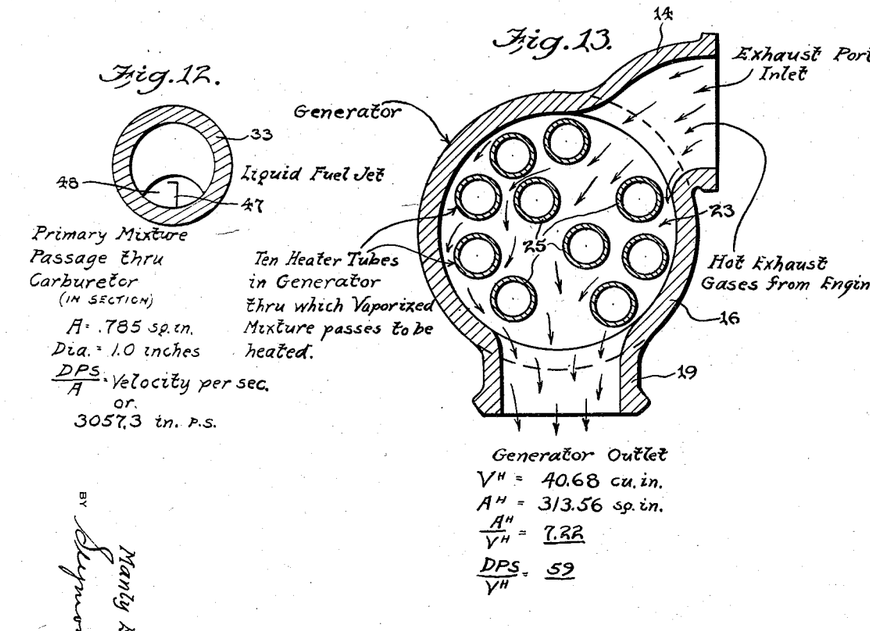
Fig. 12 is a sectional view taken along line 12—12 of Fig. 7, and showing a section through the primary mixture passage of the carburetor.
Fig. 13 is a sectional view through the generator, taken along line 13—13 of Fig. 2.

The fundamental and critical relationships which are deemed most essential to the attainment of the results sought are illustrated diagrammatically in Figs. 12, 13, and 14 of the drawings.

Referring first to Fig. 12, this represents the essential condition which must exist at the primary mixture passage through the carburetor. The size (area) of this passage must bear such relationship to the displacement per second of the motor as to result in a velocity therethrough of approximately 3057.3 inches per second. Thus, with a basic assumption of a displacement per second (@60% volumetric efficiency) of 2400 cubic inches, the area of the primary mixture passage should be about 0.785 sq. in., i. e., the diameter should be about 1 inch.

As indicated in Fig. 13, the heater must be of such size that the surface area thereof, expressed in terms of square inches, is approximately 7.22 times the volume thereof, in cubic inches. Moreover, the ratio or relationship, displacement per second; heater volume should be approximately 59. Thus, with the aforesaid basic assumption of a displacement per second of 2400 cubic inches, the heater volume should be approximately 40.68 cubic inches while the heater area should be approximately 313.56 square inches.

Fig. 14 represents the relative critical size of the cooling unit. The relationship, surface area (in square inches); volume (in cubic inches), in the cooling unit should be approximately 8.16, while the volume should be approximately 1/48th of the displacement per second. Accordingly, with the aforesaid basic assumption of a 2400 cu. in. per sec. displacement, the volume of the cooling unit should be approximately 49.96 cu. in., and the cooler area should be about 408.2 sq. inches.

A unit incorporating the structural and dimensional relationship of parts hereinbefore set forth and based on the displacement per second of the motor will always produce a fuel gas of constant character as indicated by the following actual test results:

With motor of 200 cu. in. displacement, constructed according to the present invention, operating at a speed of 600 R. P. M., 60,000 cu. in. of prepared mixture are drawn into the motor during one minute's operation. Of this amount, between 85 and 90% passes through the generator, and the balance through the secondary air valve. The temperature of the mixture is raised to 371° F. as a result of passage through the generator. The temperature of the processed mixture is then reduced by gradual cooling by radiation in the cooling unit to 250° F. The mixture is then passed through a venturi or valve-controlled construction or nozzle into a mixing chamber where it is further reduced to a temperature of 155° F. by the addition of 10 to 15% of secondary air at atmospheric temperature.

The same motor, operating at a speed of 2400 R. P. M., results in the drawing in of 240,000 cu. in. of prepared mixture into the motor per minute of operation. Of this amount, only 17% of the total air used is passed through the generator, the balance being admitted through the secondary air valve. The temperature of the mixture is raised to 418° F. by passage through the generator. The temperature of the processed mixture is reduced by means of gradual cooling by radiation in the cooling unit to 260° F. The mixture is then passed through the regulable constriction into the mixing chamber where the temperature thereof is further reduced to 158° F. by the addition of the balance (83%) of air (secondary) which is at atmospheric temperature.

It is thus apparent that the mixture which was supplied to the intake manifold in the foregoing two cases involved a variation in temperature at the intake manifold of only about 3°, in spite of the fact that the engine was operating in one case at 600 R. P. M. (producing exhaust gases at 933° F.), and at 2400 R. P. M. (producing exhaust gases at 1523° F.) in the other case.

The total air: fuel ratio in the two cases was about 12.

While I have disclosed what I now consider to be preferred embodiments of the invention in such manner that they may be readily understood by those skilled in the art, I am aware that changes may be made in the details disclosed without departing from the spirit of the invention, as expressed in the claims.

Having fully described my invention what I claim as new and desire to secure by Letters Patent, is:—

1. In an internal combustion engine having an intake manifold, a carburetor, a conduit extending from said carburetor to said intake manifold, said conduit comprising a primary mixture passage, a non-catalytic gasifier, and a cooling unit, means for forming a constriction in said conduit between said cooling unit and said manifold, said conduit being provided with a secondary air valve anterior to said constriction, the velocity of gaseous mixture through said primary mixture passage being defined by the relationship $$\frac{DPS}{A} = \text{approximately } 3057.3 \text{ in. per sec.}$$

D P S being the displacement per second, in cubic inches, of the engine, and A being the cross sectional area of the primary mixture passage.

2. In an internal combustion engine having an intake manifold, a carburetor, a conduit extending from said carburetor to said intake manifold, said conduit comprising a primary mixture passage, a non-catalytic gasifier, and a cooling unit, means for forming a constriction in said conduit between said cooling unit and said manifold, said conduit being provided with a secondary air valve anterior to said constriction, said gasifier and cooling unit being of such relative size as approximately to satisfy the relationship:

$$V^h : V^c = 48 : 59$$

wherein $V^h$ is the volume of the gasifier and $V^c$ is the volume of the cooling unit.

3. In an internal combustion engine having an intake manifold, a carburetor, a conduit extending from said carburetor to said intake manifold, said conduit comprising a primary mixture passage, a non-catalytic gasifier, and a cooling unit, means for forming a constriction in said conduit between said cooling unit and said manifold, said conduit being provided with a secondary air valve anterior to said constriction, said gasifier being so constructed that the volume thereof bears approximately the following relationship to its surface area:

$$\frac{A^h}{V^h} = 7.22$$

wherein $A^h$ is the surface area in square inches and $V^h$ is the volume in cubic inches of the gasifier.

4. In an internal combustion engine having an intake manifold, a carburetor, a conduit extending from said carburetor to said intake manifold, said conduit comprising a primary mixture passage, a non-catalytic gasifier, and a cooling unit, means for forming a constriction in said conduit between said cooling unit and said manifold, said conduit being provided with a secondary air valve anterior to said constriction, said cooling unit being so constructed that the volume thereof bears approximately the following relationship to its surface area:

$$\frac{A^c}{V^c} = 8.16$$

wherein $A^c$ is the surface area in square inches and $V^c$ is the volume in cubic inches of the cooling unit.

5. In an internal combustion engine having an intake manifold, a carburetor, a conduit extending from said carburetor to said intake manifold, said conduit comprising a primary mixture passage, a non-catalytic gasifier, and a cooling unit, means for forming a constriction in said conduit between said cooling unit and said manifold, said conduit being provided with a secondary air valve anterior to said constriction, the effective displacement in cubic inches per second of said engine being approximately 59 times as great as the volume in cubic inches of said gasifier and approximately 48 times as great as the volume in cubic inches of said cooling unit.

6. In an internal combustion engine having an intake manifold, a carburetor, a conduit extending from said carburetor to said intake manifold, said conduit comprising a primary mixture passage, a non-catalytic gasifier, and a cooling unit, means for forming a constriction in said conduit between said cooling unit and said manifold, said conduit being provided with a secondary air valve anterior to said constriction, the parts being so dimensioned that the relationship $$A : V^h : V^c \text{ is approximately } 0.758 : 40.68 : 49.96$$

wherein A is the cross sectional area of the primary mixture passage in square inches, $V^h$ is the volume in cubic inches of the gasifier, and $V^c$ is the volume in cubic inches of the cooling unit.

7. In an internal combustion engine having an intake manifold, a carburetor, a conduit extending from said carburetor to said intake manifold, said conduit comprising a primary mixture passageway, a gasifier and a cooling unit, said gasifier including a series of tubes, means for directly heating said tubes by exhaust gases from the engine, said cooling unit being positioned between the gasifier and the intake manifold and provided with heat dissipating fins, a pipe extending downwardly from the outlet end of the cooling unit to the intake manifold and forming part of said conduit, a restricted tube projecting from the outlet end portion of the cooling unit into said pipe, a needle valve for controlling the flow of fluid through the last-mentioned tube, means including a valve operable by the suction of the engine for leading secondary air into the pipe between the outlet end of the cooling unit and the outlet end of the last-mentioned tube, and a throttle valve in the pipe between the last-mentioned tube and the intake manifold.

MANLY E. CARROLL.